United States Patent [19]

Kondo et al.

[11] Patent Number: 4,735,848
[45] Date of Patent: Apr. 5, 1988

[54] MAGNETIC RECORDING MEDIUM

[75] Inventors: Hirofumi Kondo, Kanagawa; Takahiro Kawana, Miyagi; Hiroshi Yatagai, Tokyo, all of Japan

[73] Assignee: Sony Corporation, Tokyo, Japan

[21] Appl. No.: 1,044

[22] Filed: Jan. 7, 1987

[30] Foreign Application Priority Data

| Jan. 9, 1986 | [JP] | Japan | 61-2494 |
| Apr. 7, 1986 | [JP] | Japan | 61-79514 |
| Apr. 7, 1986 | [JP] | Japan | 61-79515 |
| Apr. 7, 1986 | [JP] | Japan | 61-79516 |

[51] Int. Cl.$^4$ ............................ G11B 5/71; G11B 5/72
[52] U.S. Cl. ........................ 428/219; 427/128; 427/131; 427/132; 428/341; 428/421; 428/422; 428/694; 428/695; 428/900
[58] Field of Search ............... 428/694, 695, 422, 421, 428/900, 704, 457, 219, 341; 427/128, 131, 632; 252/62.54; 360/134–136

[56] References Cited

U.S. PATENT DOCUMENTS

| 3,490,946 | 1/1970 | Wolff | 428/900 |
| 4,213,870 | 7/1980 | Loran | 428/900 |
| 4,232,072 | 11/1980 | Pardee | 428/900 |
| 4,268,556 | 5/1981 | Pedrotty | 428/900 |
| 4,309,482 | 1/1982 | Suzuki | 428/900 |
| 4,327,139 | 4/1982 | Schaefer | 428/65 |
| 4,425,404 | 1/1984 | Suzuki | 428/900 |
| 4,612,244 | 9/1986 | Kaneda | 428/694 |
| 4,624,892 | 11/1986 | Ishizaki | 428/323 |
| 4,645,703 | 2/1987 | Suzuki | 428/900 |
| 4,647,507 | 3/1987 | Suzuki | 427/131 |
| 4,692,378 | 9/1987 | Ishihara | 428/421 |

FOREIGN PATENT DOCUMENTS

| 85930 | 5/1983 | Japan | 428/694 |
| 0141439 | 8/1983 | Japan | 428/327 |

Primary Examiner—Ellis P. Robinson
Attorney, Agent, or Firm—Hill, Van Santen, Steadman & Simpson

[57] ABSTRACT

Described is a magnetic recording medium wherein a thin magnetic metal film is formed as the magnetic layer on a non-magnetic base, and wherein a carboxylic acid perfluoroalkyl ester is coated as the lubricant on the thin magnetic metal film used as the magnetic layer to produce the magnetic recording medium exhibiting good running properties, wear resistance and durability under any operating conditions.

The carboxylic acid perfluoroalkyl ester employed as the lubricant in the present invention is a compound represented by the general formula $$RCOO(CH_2)_j C_k F_{2k+1}$$

wherein R in the general formula stands for a hydrocarbon residue and $j \geq 0$ with $k \geq 4$.

7 Claims, 1 Drawing Sheet

MAGNETIC RECORDING MEDIUM

BACKGROUND OF THE INVENTION

1. Field of the Invention

This invention relates to what is called a thin magnetic metal film type magnetic recording medium, in which a thin magnetic metal film is formed as a magnetic layer on a non-magnetic base by physical vapor deposition such as vacuum evaporation or sputtering.

2. Prior Art

The magnetic recording medium so far widely used in the prior art is of the coated type in which ferromagnetic oxide powders such as powders of $\gamma$-$Fe_2O_3$, Co-containing $\gamma$-$Fe_2O_3$, $Fe_3O_4$, Co-containing $Fe_3O_4$, berthollide compounds of $\gamma$-$Fe_2O_3$ and $Fe_3O_4$, Co-containing berthollide compounds or powdered magnetic materials consisting essentially of Fe, Co or Ni are dispersed in an organic binder such as vinyl chloride-vinyl acetate copolymer, polyester resin or polyurethane resin to produce a magnetic paint which is then coated on the non-magnetic base and dried to produce the coated tape.

With increase in the demand for a high-density magnetic recording, what is called the thin magnetic metal film type magnetic recording medium obtained by directly coating a ferromagnetic metal material such as Co-Ni alloy on a non-magnetic base of a polyester or polyimide film by plating or physical vapor deposition such as vacuum evaporation, sputtering or ion plating, has been proposed and attracted general attention. This thin magnetic metal film type magnetic recording medium has a number of advantages such as superior coercive force, squareness ratio and electro-magnetic conversion characteristics in the short wavelength range, extremely small losses in thickness during reproduction and extremely small demagnetization during recording because of the reduction in thickness of the magnetic layer and the improved packing density of the magnetic material because it is no longer necessary to admix a non-magnetic organic binder into the magnetic layer.

However, in the aforementioned thin magnetic metal film type magnetic recording medium, durability or running properties are occasionally lowered due to increased effective contact area due in turn to the high surface smoothness of the magnetic layer resulting in increased frictional coefficients and sticking phenomenon and hence a demand is raised for improving these properties. In general, the magnetic recording medium is placed under a condition of high speed relative movement with the magnetic head in the course of recording and reproduction of magnetic signals. It is required that the tape running will occur smoothly and under stable conditions, while the wear or damage due to contact with the magnetic head should be minimized.

It has so far been tried to improve the durability and the running properties by forming a protective film by coating a lubricant on the magnetic layer, that is, on the surface of the thin magnetic metal film.

When the protective film is formed by coating the lubricant in the above described manner, it is required that the protective film shows good adhesivity to the thin magnetic metal film while also showing a high lubricating effect. The adhesivity and lubricating properties should remain excellent both under high temperature high humidity conditions as met in tropical and semi-tropical regions and under low temperature conditions as met in frigid regions.

However, the lubricant so far used has a limited operating temperature range and tends to solidify or become frozen under a low temperature such as 0° to −5° C. so that its lubricating properties are not exhibited satisfactorily.

SUMMARY OF THE INVENTION

It is therefore an object of the present invention to provide a lubricant having continuing adhesivity and lubricity under any operating conditions and sustained lubricating effect for a prolonged time, and magnetic recording medium superior in durability and running properties.

The present invention provides a magnetic recording medium wherein a thin magnetic metal film is formed as the magnetic layer on a non-magnetic base, and wherein a carboxylic acid perfluoroalkyl ester is coated as the lubricant on the thin magnetic metal film used as the magnetic layer to produce the magnetic recording medium exhibiting good running properties, wear resistance and durability under any operating conditions.

The lubricant layer containing carboxylic acid perfluoroalkyl ester becomes affixed to the thin magnetic metal layer to exhibit a good lubricating action to reduce the frictional coefficient. Above all, carboxylic acid perfluoroalkyl esters exhibit good lubrication even under the lower temperature.

DETAILED DESCRIPTION OF THE INVENTION

The present inventors have conducted eager researches into attaining the above object and arrived at the present invention on the basis of a finding that a carboxylic acid perfluoroalkyl ester, which is an ester of an aliphatic carboxylic acid and a perfluoro alcohol, may exhibit superior lubricating effect over a wide temperature range. The present invention is characterized in that a thin magnetic metal film is formed on a non-magnetic base, and a carboxylic acid perfluoroalkyl ester is deposited on the thin magnetic metal film.

The carboxylic acid perfluoroalkyl ester employed as the lubricant in the present invention is a compound represented by the general formula

$$RCOO(CH_2)_j C_k F_{2k+1} \quad \text{(I)}$$

wherein R in the general formula stands for a hydrocarbon residue and $j \geqq 0$ with $k \geqq 4$. The hydrocarbon residue R of the carboxylic acid may be straight or branched and may also be saturated or unsaturated. The hydrocarbon residue may be an aryl group or a perfluoro hydrocarbon residue.

The number $k$ of carbon atoms in the perfluoroalkyl group ($-C_k F_{2k+1}$) is preferably more than 4 and more preferably more than 6.

The carboxylic acid perfluoroalkyl ester may easily be synthesized by the reaction for example of the corresponding acid chloride and fluorine-containing alco- hols. The reaction proceeds in accordance with the following formula (1).

The acid chloride can easily be synthesized by chlorinating commercially available aliphatic carboxylic acid by phosphorus pentachloride $PCl_5$ or thionyl chloride $SOCl_2$. Above all, aliphatic carboxylic acids with a lesser number of carbon atoms can be chlorinated with commercially available thionyl chloride $SOCl_2$. The reaction proceeds in accordance with the following formula (2).

The fluorine-containing alcohols $C_kF_{2k+1}(CH_2)_jOH$ can easily be synthesized in such a manner that perfluoro carboxylic acid obtained for example by the Simonds method is chlorinated in the presence of dimethylformamide (DMF) and reduced in the presence of a reducing agent. The reaction may proceed in accordance with the following formula (3).

Perfluoro alcohols shown by the general formula $C_kF_{2k+1}CH_2CH_2OH$ are also available.

The carboxylic acid perfluoroalkyl esters synthesized in the above described manner may be used singly as a lubricant or as an admixture with known lubricants for further increasing the range of operating temperatures.

The lubricants that may be used may include aliphatic acids or metal salts thereof, aliphatic acid amides, aliphatic acid esters, aliphatic alcohols or alkoxides thereof, aliphatic amines, polyhydric alcohols, sorbitan esters, mannite esters, sulfurized aliphatic acids, aliphatic mercaptan, modified silicone oil, perfluoroalkyl ethylene oxides, perfluoro polyethers, higher alkyl sulfonic acids or metal salts thereof, perfluoroalkyl sulfonic acids or ammonium or metal salts thereof, perfluoroalkyl carboxylic acid or metal salts thereof, or perfluoroalkyl carboxylic acid esters.

Above all, perfluoroalkyl carboxylic acid esters shown by the general formula $C_nF_{2n+1}COOR$, wherein n represents an integer of 6 to 10 and R hydrocarbon residues with 1 to 25 carbon atom residues, are superior in low-temperature behavior and hence may be advantageously employed with the aforementioned carboxylic acid perfluoroalkyl esters.

On the other hand, perfluoro polyethers may include polyethers represented by general formulas or with or without introduction thereto of polar groups such as hydroxy-, carboxy-, phosphate- or sulfonate groups or salts thereof, or ester groups, and exhibit superior oxidation resistancy and lubricating properties.

In the above formulas, x, y, q and r stand for integers in the range from 40 to 500.

By employing these perfluoro polyethers with carboxylic acid perfluoroalkyl esters in a compositional weight ratio of 30:70 to 70:30, it is possible to deal with more severe operating conditions and to maintain lubricating properties.

Extreme pressure agents may be used in a compositional weight ratio of 30:70 to 70:30 in order to meet more severe operating conditions and to realize a sustained lubricating effect.

The extreme pressure agents are reacted on partial metallic contact in the boundary lubricating area with the metal surface under the accompanying frictional heat to produce a film of the reaction product for inhibiting the friction and resulting attrition. Phosphorus, sulfur, halogen and organometal system extreme pressure agents and composite type extreme pressure agents are known in the art.

The phosphorus system extreme pressure agents may be enumerated by phosphoric acid esters such as tributyl phosphate, trioctyl phosphate, tri-2-ethylhexyl phosphate, trilauryl phosphate, trioleyl phosphate, dibutyl phosphate, dioctyl phosphate, di-2-ethylhexyl phosphate, dilauryl phosphate or dioleyl phosphate, phosphorous acid esters such as tributyl phosphite, trioctyl phosphite, tri-2-ethylhexyl phosphite, trilauryl phosphite, trioleyl phosphite, dibutyl phosphite, dioctyl phosphite, di-2-ethylhexyl phosphite, dilauryl phosphite or dioleyl phosphite and phosphoric acid ester amine salts such as dibutyl phosphate butyl amine salt, dibutyl phosphate octyl amine salt, dibutyl phosphate stearyl amine salt, dioctyl phosphate butyl amine salt, dioctyl phosphate octyl amine salt, dioctyl phosphate lauryl amine salt, dioctyl phosphate stearyl amine salt, di-2-ethylhexyl phosphate butyl amine salt, di-2-ethylhexyl phosphate octyl amine salt, di-2-ethylhexyl phosphate lauryl amine salt, di-2-ethylhexyl phosphate stearyl amine salt, dilauryl phosphate butyl amine salt, dilauryl phosphate octyl amine salt, dilauryl phosphate lauryl amine salt, dilauryl phosphate stearyl amine salt, dioleyl phosphate butyl amine salt, dioleyl phosphate octyl amine salt, dioleyl phosphate lauryl amine salt or dioleyl phosphate stearyl amine salt.

The sulfur system extreme pressure agents may be enumerated by mineral oils having unsaturated bonds such as sulfides of dipentene or sperm oil, sulfides of oil and fat obtained by heating oil and fat with sulfur, disulfides such as dibenzyl disulfide, diphenyl disulfide, di-t-butyl disulfide, di-sec-butyl disulfide, di-n-butyl disulfide, di-t-octyl disulfide or diethyl disulfide, monosulfides such as benzyl sulfide, diphenyl sulfide, divinyl sulfide, dimethyl sulfide, diethyl sulfide, di-t-butyl sulfide, di-sec-butyl sulfide, or di-n-butyl sulfide, polysulfides such as dimethyl trisulfide, di-t-butyl trisulfide, di-t-nonyl polysulfide or olefin polysulfides, thiocarbonates represented by the general formula or wherein R stands for hydrocarbon residues, and element sulfur.

The halogen system extreme pressure agents may be enumerated by bromine compounds such as allyl bromide, octadecyl bromide, cyclohexyl bromide, stearyl bromide or benzyl bromide, iodine compounds such as benzyl iodide, allyl iodide, butyl iodide, octadecyl iodide or cyclohexyl iodide, and chlorine compounds such as hexachloroethane, monochloroethane, chlorinated paraffin, chlorinated diphenyl, chlorinated oil and fat, methyltrichloro-stearate, pentachloro-pentadienoic acid, esters of hexachloro-naphthenic acid compounds, or imide derivatives of hexachloro-naphthenic acid compounds.

The organometal system extreme pressure agents may be enumerated by thiophosphates such as diisobutyl zinc dithiophosphate, isobutyl pentyl zinc dithiophosphate, isopropyl-1-methylbutyl zinc dithiophospate, isobutyl nonyl phenyl zinc dithiophosphate, isobutyl heptyl phenyl zinc dithiophosphate, diheptyl phenyl zinc dithiophosphate, dinonyl phenyl zinc thiophosphate or molybdenum dithiophosphate, thiocarbamates such as dimethyl zinc dithiocarbamate, diethyl zinc dithiocarbamate, dibutyl zinc dithiocarbamate, ethyl phenyl zinc dithiocarbamate, dibenzyl zinc dithiocarbamate, dimethyl zinc dithiocarbamate, dimethyl copper dithiocarbamate, dimethyl iron dithiocarbamate, diethyl selenium dithiocarbamate or diethyl silver dithiocarbamate, and metal alkyl dithiocarbamates such as molybdenum or antimony alkyl dithiocarbamates.

The effective composite type extreme pressure agents may be enumerated by dialkyl amine thiophosphates such as di-2-ethylhexyl amine dithiophosphate, phosphoric acid esters of alkyl halogenides such as propyl chloride phosphate, propyl bromide phosphate, propyl iodide phosphate, butyl chloride phosphate, butyl bromide phosphate or butyl iodide phosphate, chloronaphthaxanthate, thiophosphates represented by general formulas where R represents a hydrogen atom, an alkyl group, an alkenyl group or an aryl group, and thiophosphites represented by the general formula where R represents a hydrogen atom, an alkyl group, an alkenyl group or an aryl group.

The aforementioned extreme pressure agents may be used singly or as an admixture.

In affixing a lubricant layer containing these carbonic acid perfluoroalkyl esters on a thin magnetic metal film, a solution obtained by dissolving the aforementioned lubricant in a solvent may be coated or sprayed onto the surface of the thin magnetic metal film or, conversely, the thin magnetic metal film may be immersed in the solution and dried.

It is noted that the amount of the lubricant to be coated is preferably in the range of 0.5 to 100 mg/m$^2$ and more preferably in the range of 1 to 20 mg/m$^2$. If the amount to be coated is too small, the desired results such as lower frictional coefficient or higher wear resistance and durability are not exhibited. If the amount to be coated is too large, a sticking phenomenon is caused to occur between the sliding member and the thin magnetic metal film so that the running properties are lowered.

If needed, rust preventives may be used in addition to the aforementioned lubricants and extreme pressure agents.

While the thin magnetic metal film is formed of metallic materials and generally tends to be rusted, its corrosion resistance may be markedly improved by using these rust preventives. This results in improved durability of the magnetic recording medium in conjunction with the lubricating action proper to the aforementioned lubricant containing carboxylic acid perfluoroalkyl esters.

As usable rust preventives, those commonly used as the rust preventives for this kind of magnetic recording medium may be employed, such as phenols, naphthols, quinones, diarylketones, heterocyclic compounds containing nitrogen, oxygen or sulfur atoms, compounds containing mercapto groups, thiocarboxylic acids or salts thereof, and thiazole compounds.

The phenols may be enumerated by bivalent phenols, alkylphenols or nitrosophenols.

The bivalent phenols may include pure phenols such as hydroquinone, resorcin or catechol or alkyl-, amino-, nitro- or halogeno substitutes thereof, such as 2-methyl hydroquinone, 4-methyl resorcinol, 5-methyl resorcinol, 4-methyl pyrocatechol, 2,5-dimethyl hydroquinone, 4,6-dimethyl resorcinol, 2,5-dimethyl resorcinol, 2-isopropyl-5-methyl hydroquinone, 2-tert-butyl hydroquinone, 2,5-di-tert-butyl hydroquinone, 4-tert-butyl catechol, 2-amino resorcinol, 2-resorcinol and 2,5-dichloro hydroquinone.

The alkyl phenols stand for alkyl substitutes of monovalent phenols and may include for example o-cresol, m-cresol, p-cresol, o-ethyl phenol, m-ethyl phenol, p-ethylphenol, 2,3-, 2,5-, 2,6-, 3,4-, or 3,5-dimethyl phenol, 2,4,6- or 2,4,5-trimethyl phenol, 5-isopropyl-2-methyl phenol, p-tert-butyl phenol, 2,6-di-tert-butyl-p-cresol, 4,4'-methylene bis 2,6-di-tert-butyl phenol, 2,6-dimethyl-4-tert-butyl phenol or 2,4,6-tri-tert-butyl phenol.

The nitroso phenols may include for example 4-nitroso-2-methoxy-1-phenol, 4-nitroso-2-ethoxy-1-phenol, 6-nitroso-o-cresol, 4-nitroso-m-cresol, o-nitroso phenol, 2-nitroso phenol, 2-nitroso resorcin, 4-nitroso resorcin or p-nitroso phenol.

The naphthols may be enumerated by pure naphthols such as α- or β- naphthols, 1,2-, 1,3-, 1,4-, 1,5-, 1,7-, 1,8-, or 2,3-napthalene diols, 1,4,5-naphthalene triol, or 1,2,5,8-naphthalene tetraol, and nitro-, nitroso-, aminoor halogeno-substituted naphthols such as 1-chloro-2-naphthol, 2,4-dichloro-1-naphthol, 1-nitro-2-naphthol, 1,6-dinitro-2-naphthol, 1-nitroso-2-naphthol, 2-nitroso-1-naphthol, or 1-amino-2-naphthol.

The quinones may be enumerated by unsubstituted quinones such as p- or o- benzoquinone, 1,2- or 1,4-naphthoquinone, anthraquinone, 9,10-phenanthrene quinone or diphenoquinone, methylquinones such as methyl-p-benzoquinone, 2,3-dimethyl-p-benzoquinone, 2-methyl-1, 4-naphtoquinone, or 2-methyl anthraquinone, hydroxyquinones such as 2,5-dihydroxy-p-benzoquinone, tetrahydroxy-p-benzoquinone, 5-hydroxy-1,4-naphthoquinone, 2,3-dihydroxy-1,4-naphthoquinone, 5,8-dihydroxy-1,4-naphtoquinone, 2-hydroxy anthraquinone, 1,2-dihydroxy anthraquinone, 1,2,3-trihydroxy anthraquinone, or 1,2,4-, 1,2,5-, 1,2,6- or 1,2,7-trihydroxy anthraquinone, aminoquinones such as 2-amino anthraquinone, 1,2-diamino anthraquinone, nitroquinones such as 1-nitro anthraquinone or 1,5-dinitro anthraquinone, halogenoquinones such as 2,6-dichloro-p-benzoquinone, tetrachloro-p-benzoquinone or tetrabromo-p-benzoquinone, and quinones having two or more substituents such as 2,5-dichloro-3,6-dihydroxy-p-benzoquinone or 1-methyl-2-hydroxy-1,4-naphthoquinone.

The diaryl ketones may be enumerated by benzophenone and its derivatives, such as benzophenone, alkyl-substituted benzophenone such as 4- or 3-methyl benzophenone, 3,4-, 4,4'-, or 3,4'-dimethyl benzophenone or 4-ethylbenzophenone, hydroxy benzophenones such as 4-hydroxybenzophenone, 4,4'-dihydroxy benzophenone, 2,3,4-trihydroxy benzophenone, 2,4-dihydroxy benzophenone, 2,2',5,6'-tetrahydroxy benzophenone or 2,3', 4,4', 6-pentahydroxy benzophenone, aminobenzophenones such as 4-amino benzophenone or 4,4'-diaminobenzophenone, and substituted benzophenones having two or more substituents, such as 4-methoxy-2-hydroxy benzophenone or 2,2'-dihydroxy-4-methoxy benzophenone.

The heterocyclic compounds containing nitrogen atoms may be enumerated by compounds having phenolic hydroxy groups such as 4-(2-pyridylazo)-resorcin, 1-(2-pyridylazo)-2-naphthol, 4-quinolinol, 4-methyl-2-quinolinol, 8-quinolinol or quinoline diol, compounds having carboxylic groups such as kynurenic acid, acridinic acid, atophan, quinaldinic acid, cinchonic acid, isonicotinic acid, 2,5-pyridine dicarboxylic acid or quinic acid, compounds having amino or imino groups, such as 2-aminobenzimidazole, 5-amino-1H-tetrazole, 5-amino-1H-1, 2, 4-triazole, adenine, guanine, luminol, 2-hydrazino quinoline or thiamine, and compounds having carbonyl groups such as riboflavin, theobromine, allantoin, alloxan, 2-thiobarbituric acid, violuric acid, isatin, hydantoin, thymine, barbituric acid, orotic acid, uracil, succinimide, creatinine or 2-pyrrolidone, in addition to acridine, 2,2',2"-tripyridyl neocuproine, 2,2'-dipyridyl benzotriazole, 5-methyl benzotriazole, basophenanthroline, 1,10-phenanthroline, aldehyde collidine, benzyl pyridine, phenyl pyridine, quinazoline and 2-heptadecylimidazole.

The heterocyclic compounds containing oxygen atoms may be enumerated by tocopherol, morin, quercetin, ascorbic acid, 1,8-naphthalic anhydride, resorufine, kojic acid, dehydroacetic acid, oxazole, 3-aminophthalimide, 4-aminophthalimide, uridine, thymidine, guanocine and isatoic acid anhydride.

The heterocyclic compound containing sulfur atoms may be enumerated by sulforane, 3-hydroxy sulforane, 3-methyl sulforane, sulforene, 3-hydroxy sulforene, 3-methyl sulforene, rhodanine, 3-amino-rhodanine, thiazoline-4-carboxylic acid, 4H-1,4-thiazine, biotin, 3,6-thioxanethene diamine, or 3,6-thioxanthene diamine-10,10-dioxide.

The compounds containing mercapto groups may be enumerated by 2-benzooxazole thiol, thiophenol, thiosalicylic acid, propanethiol, thiouracyl, 2,3-quinoxaline dithiol, dithizone, thioxine, 2-benzimidazol thiol, 6-thioguanine, 5-nitro-2-benzimidazole thiol and 5-amino-1,3,4-thiazole 2-thiol.

The thiocarboxylic acid and salts thereof may be enumerated by sodium diethyldithio carbamate, ethane thio-acid, rubeanic acid, thioacetoamide and ethanedithio-acid.

The thiazolic compounds may be enumerated by bismuthiol II, diazosulfide, azosulfim, 1,3,4-thiadiazole, benzothiazole, 2-methyl benzothiazole, 2-(p-aminophenyl)-6-methyl benzothiazole, 2-mercaptobenzothiazole, benzothiazoline, 2-benzothiazoline and benzothiazolone.

Figure 1:
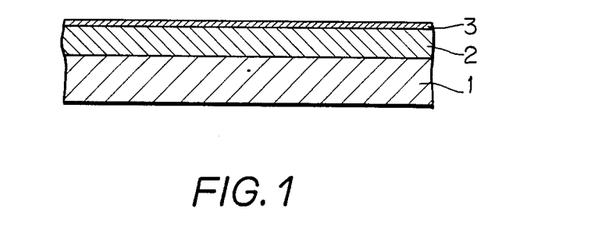
FIG. 1 is a sectional view showing an example of the magnetic recording medium to which the present invention is applied.
Figure 2:
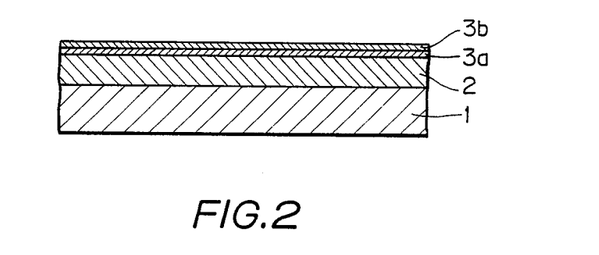
FIG. 2 is a sectional view showing another example of the magnetic recording medium to which the present invention is applied.

The rust preventives may be used as an admixture with the lubricants in a compositional weight ratio of 30:70 to 70:30 as shown in FIG. 1, however, the coating may be applied in two or more layers as shown in FIG. 2, as by coating rust preventives on the surface of the thin magnetic metal film, followed by coating the aforementioned carboxylic acid perfluoroalkyl ester containing lubricant.

When coating in two layers in this manner, the rust preventives may preferably be coated in an amount of 0.5 to 100 mg/m$^2$ and more preferably in an amount of 1 to 20 mg/m$^2$ as the aforementioned lubricant. With too small coating amount, the effect in improving corrosion resistance becomes insufficient and, with too large coating amount, the running properties are lowered.

The magnetic recording medium to which the present invention is applied consists of a non-magnetic base formed with a thin magnetic metal film as a magnetic layer. The materials of the non-magnetic base may include polyesters such as polyethylene terephthalate, polyolefins such as polyethylene or polypropylene, cellulose derivatives such as cellulose triacetate, cellulose diacetate or cellulose acetate butylate, vinyl resins such as polyvinyl chloride, or polyvinylidene chloride, plastics such as polycarbonate, polyimide or polyamideimide, light metals such as aluminium or titanium alloys or ceramics such as alumina grass. The non-magnetic base may be in the form of a film, sheet, disk, card or a drum as desired.

The surface of the non-magnetic base may be formed with one or more ridge-like, or wrinkle-like projections or particlulate projections in order to control surface roughness.

The ridge-like projections may be formed for example by incorporating fine particles of the inorganic material of the order of 500 to 3000 Å during film forming so that these projections have the height from the polymer film surface of 100 to 1000 Å and the density of ca. $1 \times 10^4$ to $10 \times 10^4$ number/mm$^2$. As the inorganic material used for the preparation of the ridge-like projections, calcium carbonate (CaCO$_3$), silica or alumina are preferred.

The wrinkle-like projections are obtained by coating a dilute solution of a resin in a specific solvent mixture followed by drying with the height being 0.01 to 10 micron and preferably 0.03 to 0.5 micron and the minimum interval between the projections being 0.1 to 20 microns. As the resin for forming these wrinkle-like projections, saturated polyesters such as polyethylene naphthalate or terephthalate, polyamide, polystyrene, polycarbonate, polyacrylate, polysulfone, polyethersulfone, polyvinyl chloride, polyvinylidene chloride, polyvinyl butyral, polyphenylene oxide or phenoxy resin, soluble in suitable solvents, may be used singly, in an admixture or as a copolymer. These resins are dissolved in a good solvent therefor to produce a solution having a resin concentration of 1 to 1000 ppm. To the solution is added another solvent which is a poor solvent for the resin and which has a boiling point higher than that of the aforementioned good solvent in an amount 10 to 100 times that of the resin to produce a solution which is then coated on the surface of the polymer film and dried to produce a thin layer having extremely fine wrinkle-like projections and recesses.

The particulate projections are formed by affixing ultra-fine particles of organic materials such as acrylic resin or inorganic fine particles of silica or metal powders in spherical or semi-spherical form, these particulate projections having the height of 50 to 500 Å and a density of ca. $1 \times 10^6$ to $5 \times 10^6$ number/mm$^2$.

While it is possible to control the surface properties of the thin magnetic metal surface as the magnetic layer by forming at least one of these differenct projections, more pronounced results may be obtained by using two or more of these projections. Above all, the durability and running properties are markedly improved by forming wrinkle-like and particulate projections on the base film having the ridge-like projections.

The overall height of the projections may preferably be in the range of 100 to 2000 Å while the density thereof may preferably be $1 \times 10^5$ to $1 \times 10^7$ number/mm$^2$ on an average.

The thin magnetic metal film as the magnetic layer is formed as a continuous film using such as vacuum evaporation, ion plating or sputtering.

The vacuum evaporation above referred to consists in vaporizing the magnetic metal material under a vacuum of $10^{-4}$ to $10^{-8}$ Torr by resistance high-frequency or electron beam heating to deposit vaporized magnetic metal material on a base. In general, an oblique evaporation process of depositing the magnetic metal material obliquely to the base is adopted for obtaining a high coercive force. The evaporation may be carried out under an oxygen atmosphere in order to produce a higher coercive force.

The ion plating as one of the vacuum evaporation process consists in effecting a DC or RF glow discharging in an inert gas atmosphere of $10^{-4}$ to $10^{-3}$ Torr in order to allow the magnetic metal material to be vaporized during discharging.

The sputtering process consists in effecting a glow discharge in an atmosphere consisting essentially of an argon gas of $10^{-3}$ to $10^{-1}$ Torr to strike out atoms on the target surface by the thus evolved argon gas ions. The process may be classified into DC bi- or tri-polar sputtering, RF sputtering or a magnetron sputtering using magnetron discharging. When employing the sputtering process, base coat films of Cr, W or V may be formed in advance of sputtering.

No matter which of the aforementioned processes is employed, base coat metal films of Bi, Sb, Pb, Sn, Ga, In, Gd, Ge, Si or Ti are previously coated on the base plate or substrate and the film formation is perpendicular to the base plate to provide a magnetic layer free of magnetic anisotropy and superior in in-plane isotropy in a manner convenient for forming the magnetic disk.

The magnetic metal materials employed in forming the thin magnetic metal film by the physical vapor deposition may include, in addition to metals such as Fe, Co or Ni, Co-Ni, Co-Pt, Co-Ni-Pt, Fe-Co, Fe-Ni, Fe-Co-Ni, Fe-Co-B, Co-Ni-Fe-B or Co-Cr alloys, occasionally containing metals such as Cr or Al. Above all, a perpendiculary magnetized film may be obtained by using a Co-Cr alloy.

The film thickness of the magnetic layer formed in this manner is of the order of 0.04 to 1 micron.

A so-called back coat may be formed on the surface opposite to the side of forming the magnetic layer of the non-magnetic base. This back coat is formed by coating on the surface of the non-magnetic base a back-coat paint obtained by mixing and dispersing a resin binder and powdered constituent in an organic solvent.

The resin binder used in the back coat paint may be enumerated for example by synthetic resin such as a vinyl chloride-vinyl acetate copolymer, a vinyl chloride-vinylidene chloride copolymer, a vinyl chloride-acrylonitrile copolymer, acrylic acid ester-acrylonitrile copolymer, thermoplastic polyurethane elastomer, polyvinyl fluoride, vinylidene chloride-acrylonitrile copolymer, butadiene-acrylonitrile copolymer, polyamide resin, polyvinyl butyral, cellulose derivatives, polyester resins or polybutadiene, phenol resin, epoxy resin, cured polyurethane resin, melamine resin, alkyd resin, silicone resin, acrylic reactive resin, epoxypolyamide resin, nitrocellulose-melamine resin, a mixture of high-polymer polyester resin and isocyanate prepolymer, a mixture of polyester polyol and polyisocyanate, urea-folmaldehyde resin, a mixture of low molecular weight glycol/high molecular weight diol/triphenylmethane triisocyanate, a polyamine resin, and mixtures thereof.

Alternatively, the resin binder having the hydrophilic polar groups may be used for improving dispersibility of the powdered components.

As practical examples, there may be used polyurethane resin, polyester resin, vinyl chloride-vinyl acetate copolymer, vinylidene chloride copolymer, acrylic acid ester copolymer or butadiene copolymer into which are introduced hydrophilic polar groups selected from the group consisting of —SO$_3$M, —OSO$_3$M, —COOM, and wherein M stands for a hydrogen atom or an alkali metal and M' a hydrogen atom, an alkali metal or a hydrocarbon residue.

While the hydrophilic polar groups may be introduced in a number of ways depending on the kinds of the resin, they may be introduced into, for example, the polyurethane or polyester resins by any of the following methods.

(i) The hydrophilic polar groups are previously introduced into the dibasic acid or polyol that are the starting materials for polyurethane or polyester.

(ii) The OH-groups are allowed to remain on the terminal or side chain and are modified by compounds having hydrophilic polar groups.

When using the method (ii), the following sequences of steps (ii)-1 and (ii)-2 may be used.

(ii)-1

The compound containing hydrophilic polar groups and halogen such as chlorine in the molecule and the polyurethane of polyester resin in which polyfunctional polyol is used as the starting material and the OH-groups are allowed to remain at the side chain or at the terminal of the polymer chain are dissolved in a solvent in which the both components are soluble, such as dimethylformamide or dimethylsulfoxide. The hydrophilic polar groups are introduced by virtue of the reaction between OH-groups and chlorine for removal of hydrochloric acid in the presence of the agent for hydrochloric acid elimination such as amines such as pyridine, picoline or triethylamine or epoxy compounds such as ethylene or propylene oxide.

(ii)-2

The compound having the hydrophilic polar groups and OH-groups in the molecule and the polyurethane or polyester resins having OH-groups remaining in the side chain or terminal of the polymer chain are reacted together through diisocyanate compounds.

On the other hand, the following methods may be used for introducing hydrophilic polar groups into the copolymeric resin binder:

(iii) The method of using a compound having copolymerizable double bonds and hydrophilic polar groups as the copolymerizable monomer.

(iv) The method of using a compound having copolymerizable double bonds and active hydrogen is used, the active hydrogen is introduced into the side chain of the copolymer and a compound having a group that can react with the active hydrogen and the hydrophilic polar group is used to effect modification.

(v) The method in which a compound having copolymerizable double bonds and group that can react with active hydrogen is used as the copolymerizable monomer, the group that can react with the active hydrogen is introduced into the side chain of the copolymer and a compound having the hydrophilic polar groups and the active hydrogen is used to effect modification.

The powdered component may include fine carbon particles for affording electrical conductivity, such as furnace carbon, channel carbon, acetylene carbon, thermal carbon or lamp carbon and preferably furnace carbon and thermal carbon, and inorganic pigments, such as $\alpha$-FeOOH, $\alpha$-Fe$_2$O$_3$, Cr$_2$O$_3$, TiO$_2$, ZnO, SiO, SiO$_2$, SiO$_2 \cdot$2H$_2$O, Al$_2$O$_3 \cdot$2SiO$_2 \cdot$2H$_2$O, 3MgO$\cdot$4SiO$_2$H$_2$O, MgCO$_3 \cdot$Mg(OH)$_2 \cdot$3H$_2$O, Al$_2$O$_3$, CaCO$_3$, MgCO$_3$, or Sb$_2$O$_3$, that are added for improving durability and controlling surface roughness.

As the organic solvent for the back coat paint may be used general-purpose solvents including ketonic solvents such as acetone, methylethylketone, methylisobutylketone or cyclohexanone, esteric solvents such as methyl acetate, ethyl acetate, butyl acetate, ethyl lactate or acetic acid glycol monoethyl ether, glycol ether solvents such as glycol dimethylether, glycol monoethylether or dioxane, aromatic hydrocarbon solvents such as benzene, toluene or xylene, aliphatic hydrocarbon solvents such as hexane or heptane, chlorinated hydrocarbon solvents such as methylene chloride, ethylene chloride, carbon tetrachloride, chloroform, ethylene chlorohydrine or dichlorobenzene.

The lubricant may be simultaneously used in the back coat. Thus it may be incorporated into the back coat or coated on the surface of the back coat. In any case, any conventional lubricants such as aliphatic acid, aliphatic acid ester, aliphatic acid amide, metal soap, aliphatic alcohols, paraffin or silicone, may be used as the lubricant.

The aliphatic acids that may be used as the lubricant include saturated or unsaturated aliphatic acids having not less than 12 carbon atoms, such as lauric acid, myristic acid, palmitic acid, stearic acid, behenic acid, oleic acid, linoleic acid or linolenic acid.

The aliphatic acid esters may include ethyl stearate, butyl stearate, amyl stearate, monoglyceride stearate and monoglyceride oleate.

The aliphatic acid amides include caproic amide, capric amide, lauric amide, palmitic amide, stearic amide, behenic amide, oleic amide, linoleic amide, methylene bis stearic amide, ethylene bis stearic amide.

As the metal soap, Zn, Pb, Ni, Co, Fe, Al, Mg, Sr or Cu salts of the aforementioned aliphatic acid, or the salts with these metals of sulfonic acids such as laurylsulfonic acid, palmitylsulfonic acid, myristylsulfonic acid, stearylsulfonic acid, behenylsulfonic acid, oleylsulfonic acid, linolenic sulfonic acid or linoleic sulfonic acid.

As the aliphatic alchols, cetyl alchol or stearyl alchol may be used.

As the paraffins, saturated hydrocarbons such as n-nonadecane, n-tridecane or n-docosane may be used.

As silicone, polysiloxane having its hydrogen partially substituted by alkyl or phenyl groups and modified or not modified by aliphatic acid, aliphatic alcohols or aliphatic amides, may be used.

There may also be employed lubricants containing carboxylic acid perfluoroalkylesters similar to the lubricant layer affixed to the surface of the magnetic layer.

From the foregoing it is seen that, by using carboxylic acid perfluoroalkyl esters as the lubricant of the thin magnetic metal film type magnetic recording medium, the dynamic frictional coefficient may be reduced under any temperature conditions and the magnetic recording medium may have excellent running stability and wear resistance.

Above all, outstanding results may be obtained with the use of the tape under the lower temperature by virtue of the low coagulating point of the corboxylic acid perfluoroalkyl esters.

EXAMPLES

The description will reference to several specific examples will be given hereinbelow. It should be noted that these Examples are given by way of illustration and are not intended for limiting the scope of the present invention.

Carboxylic acid perfluoroalkyl esters were first synthesized in accordance with the following Synthesis Examples.

Synthesis Example 1

Oleic acid, linoleic acid, linolenic acid, myristic acid and palmitic acid available on the market were chlorinated by phosphorus pentachloride (PCl$_5$) or thionyl chloride (SOCl$_2$) to corresponding carboxylic acid chlorides. Butanoic acid chlorides used were those available on the market.

On the other hand, pentadecafluoro octanoic acid or nonadecafluoro decanoic acid was chlorinated with thionyl chloride (SOCl$_2$) using dimethylformamide (DMF) as the catalyst and reduced by lithium aluminum hydride to synthesize pentadecafluoro-1-octanol and nonadecafluoro-1-decanol.

The above pentadecafluoro-1-octanol or nonadecafluoro-1-decanol was dissolved with triethylamine in chloroform and one of the previously synthesized carboxylic acid chlorides was added dropwise to the resulting solution under ice cooling. After the dropwise addition, the product was stirred overnight at room temperature. The product was washed with water, 5%-dilute hydrochloric acid, an aqueous solution of $NaHCO_3$ and water in this order and resulting product was distilled in vacuum and refined.

The compounds 1 to 8 were synthesized in accordance with the above synthetic process with use of different kinds of carboxylic acid chlorides. The boiling points and yields of the resulting compounds are shown in the following Table 1.

The products were identified by infrared spectroscopic analysis (IR) and mass spectrometric analysis (MASS). For example, oleic acid pentadecafluorooctyl ester was identified by absorption at $1360 \sim 1100$ cm$^{-1}$ proper to CF, absorption of a C=O linkage in the ester at 1760 cm$^{-1}$ and absorption at 3020 cm$^{-1}$ and 2930 cm$^{-1}$ due to CH stretching vibration. This structure is supported by the presence of 664 molecular ion peak M$^+$ as ascertained by mass spectrometic analysis. Mass spectrometric analysis was conducted by using a mass spectrometer DX 303 manufactured by Nippon Denshi KK and the measurement was made after the component was found to be unitary by the preceding gas chromatography.

Synthesis Example 2

Compounds 9 to 17 were prepared by following the synthetic method of the Synthesis Example 1 and changing the kinds of carboxylic acid chloride and perfluoro alcohols. The structural formulas of the obtained compounds are shown in the following Table 2.

TABLE 2-continued

| | structural formulas |
|---|---|
| Compound 16 | $C_{17}H_{29}COOCH_2CH_2C_7F_{15}$ |
| Compound 17 | $C_7H_{15}COOCH_2CH_2C_6F_{13}$ |

Example 1

On a polyethylene terephthalate film 14 microns in thickness, Co was deposited by oblique evaporation method for forming a thin magnetic metal film 1000 Å in thickness.

Then a solution of 0.48 g of carboxylic acid perfluoroalkyl ester shown in Table 1 (compound 1 obtained by the Synthesis Example) in 800 g of Freon was coated on the surface of the thin magnetic metal film so that the amount of the lubricant will be equal to 10 mg/m$^2$. And the resulting product was cut to 8 mm widths to produce sample tapes.

Examples 2 to 17

Sample tapes were produced by using the compounds 2 to 17 of Table 1 and 2 as the carboxylic acid perfluoroalkyl esters and by otherwise following the process of the Example 1.

With each of the produced sample tapes, dynamic frictional coefficients, shuttle durability and still durability at 25° C. and relative humidity (RH) of 50% and −5° C. were tested. In testing for dynamic frictional efficient guide pins formed of stainless steel (sus 304) were used with the feed rate of 5 mm/sec and a constant tension. Shuttle durability was tested by shuttle running of two minutes each time and evaluated by the number of times of shuttling until the output decreased by −3 dB. Still durability was evaluated by the time elapsed until the output was decreased to −3 dB of the pause state output. By way of a Comparative Example, a blank tape not coated with any lubricants was tested. The results are shown in Table 3.

TABLE 1

| | | structural formulas | boiling point | yield |
|---|---|---|---|---|
| Compound 1 | oleic acid pentadecafluorooctyl ester | $C_{17}H_{33}COOCH_2C_7F_{15}$ | $163 \sim 170°$ C. (0.2 mmHg) | 85% |
| Compound 2 | linoleic acid pentadecafluorooctyl ester | $C_{17}H_{31}COOCH_2C_7F_{15}$ | $172 \sim 177°$ C. (0.2 mmHg) | 80% |
| Compound 3 | linolenic acid pentadecafluorooctyl ester | $C_{17}H_{29}COOCH_2C_7F_{15}$ | $172 \sim 175°$ C. (0.2 mmHg) | 75% |
| Compound 4 | myristic acid pentadecafluorooctyl ester | $C_{13}H_{27}COOCH_2C_7F_{15}$ | $148 \sim 151°$ C. (0.2 mmHg) | 87% |
| Compound 5 | palmitic acid pentadecafluorooctyl ester | $C_{15}H_{31}COOCH_2C_7F_{15}$ | $165 \sim 169°$ C. (0.2 mmHg) | 91% |
| Compound 6 | myristic acid nonadecafluorodecyl ester | $C_{13}H_{27}COOCH_2C_9F_{19}$ | $150 \sim 155°$ C. (0.2 mmHg) | 87% |
| Compound 7 | linolenic acid nonadecafluorodecyl ester | $C_{17}H_{29}COOCH_2C_9F_{19}$ | $175 \sim 178°$ C. (0.2 mmHg) | 72% |
| Compound 8 | butanoic acid nonadecafluorodecyl ester | $C_4H_9COOCH_2C_9F_{19}$ | $100 \sim 105°$ C. (30 mmHg) | 90% |

TABLE 2

| | structural formulas |
|---|---|
| Compound 9 | $C_{17}H_{31}COOCH_2CH_2C_6F_{13}$ |
| Compound 10 | $C_{17}H_{29}COOCH_2CH_2C_8F_{17}$ |
| Compound 11 | $C_{17}H_{33}COOCH_2CH_2C_{10}F_{21}$ |
| Compound 12 | iso-$C_{17}H_{35}COOCH_2CH_2C_{12}F_{25}$ |
| Compound 13 | ⌬—$COOCH_2CH_2C_6F_{13}$ |
| Compound 14 | $C_7F_{15}COOCH_2CH_2C_6F_{13}$ |
| Compound 15 | $C_9F_{19}COOCH_2CH_2C_6F_{13}$ |

TABLE 3

| | conditions | dynamic frictional coefficient | shuttle durability (number of times) | still durability (in minutes) |
|---|---|---|---|---|
| Ex. 1 | 25° C. | 0.25 | >150 | >120 |
| | −5° C. | 0.27 | >150 | >60 |
| Ex. 2 | 25° C. | 0.30 | >150 | >120 |
| | −5° C. | 0.35 | >150 | >60 |
| Ex. 3 | 25° C. | 0.30 | >150 | >120 |
| | −5° C. | 0.37 | >150 | >60 |
| Ex. 4 | 25° C. | 0.30 | >150 | >120 |

TABLE 3-continued

| | conditions | dynamic frictional coefficient | shuttle durability (number of times) | still durability (in minutes) |
|---|---|---|---|---|
| | −5° C. | 0.35 | >150 | >60 |
| Ex. 5 | 25° C. | 0.41 | >150 | >120 |
| | −5° C. | 0.45 | >150 | >60 |
| Ex. 6 | 25° C. | 0.28 | >150 | >120 |
| | −5° C. | 0.27 | >150 | >60 |
| Ex. 7 | 25° C. | 0.28 | >150 | >120 |
| | −5° C. | 0.35 | >150 | >60 |
| Ex. 8 | 25° C. | 0.27 | >150 | >120 |
| | −5° C. | 0.30 | >150 | >60 |
| Ex. 9 | 25° C. | 0.27 | >150 | >120 |
| | −5° C. | 0.29 | >150 | >60 |
| Ex. 10 | 25° C. | 0.25 | >150 | >120 |
| | −5° C. | 0.28 | >150 | >60 |
| Ex. 11 | 25° C. | 0.24 | >150 | >120 |
| | −5° C. | 0.26 | >150 | >60 |
| Ex. 12 | 25° C. | 0.23 | >150 | >120 |
| | −5° C. | 0.25 | >150 | >60 |
| Ex. 13 | 25° C. | 0.31 | >150 | >120 |
| | −5° C. | 0.33 | >150 | >60 |
| Ex. 14 | 25° C. | 0.27 | >150 | >120 |
| | −5° C. | 0.28 | >150 | >60 |
| Ex. 15 | 25° C. | 0.25 | >150 | >120 |
| | −5° C. | 0.26 | >150 | >60 |
| Ex. 16 | 25° C. | 0.24 | >150 | >120 |
| | −5° C. | 0.25 | >150 | >60 |
| Ex. 17 | 25° C. | 0.23 | >150 | >120 |
| | −5° C. | 0.24 | >150 | >60 |
| Comp. Ex | 25° C. | 0.90 | 3 | 2 |
| | −5° C. | — | — | — |

It is seen from these Table that the tapes according to the Examples of the present invention exhibit highly stable running properties and small dynamic frictional coefficients under both the ambient and low temperature conditions while being completely free from damage on the tape surface even after 100 times of reciprocating running. It also exhibited excellent durability such that the output decrease of −3 dB was not observed after 150 times of shuttle running. Conversely, the tape devoid of the lubricating layer according to the Comparative Example suffered from unstable running, tape wear low durability and increasing frictional coefficient with increase in the number of times of reciprocating running.

Example 18

On a polyethylene terephthalate film 14 microns in thickness, cobalt Co was deposited by an oblique evaporation method for formation of a thin magnetic metal film 1000 Å in thickness.

The surface of the thin magnetic metal film was coated with a solution obtained by dissolving 0.48 g of a carboxylic acid perfluoroalkyl ester (oleic acid pentafluorooctyl ester of the compound 1 shown in Table 1) in 800 g of Freon and admixing the resulting solution with a perfluoro polyether represented by the general formula $CF_3(O-CF(CF_3)-CF_2)_q(O-CF_2)_rOCF_3$ wherein q:r=40:1 (produced by Montedison Company Inc. under the commercial name of Fomblin) at a ratio of 1:1. The resulting coated film was cut to widths each of 8 mm to produce sample tape.

Examples 19 to 25

Sample tapes were produced by using the compounds 2 to 8 of Table 1 as the carboxylic acid perfluoroalkyl esters and by otherwise following the process of the Example 18.

Example 26

The sample tape was produced by using the same method as in Example 18 except that the solution was mixed with a carboxylic perfluoroalkyl ester (compound 1 in Table 1) and a perfluoro polyether (produced by Montedison Company Inc. under the trade name of Fomblin) at a rate of 2:1.

Example 27

Sample tape was produced by using the compounds 2 of Table 1 as the carboxylic acid perfluoroalkyl ester and by otherwise following the process of the Example 26.

Example 28

The sample tape was produced by using the same method as in Example 18 except that the solution was mixed with a carboxylic perfluoroalkyl ester (compound 3 in Table 1) and a perfluoro polyether (produced by Montedison Company Inc. under the trade name of Fomblin) at a rate of 3:1.

Example 29

Sample tape was produced by using the compounds 4 of Table 1 as the carboxylic acid perfluoroalkyl ester and by otherwise following the process of the Example 28.

Example 30

The sample tape was produced by using the same method as in Example 18 except that the solution was mixed with a carboxylic perfluoroalkyl ester (compound 5 in Table 1) and a perfluoro polyether (produced by Montedison Company Inc. under the trade name of Fomblin) at a rate of 1:2.

Example 31

Sample tape was produced by using the compounds 6 of Table 1 as the carboxylic acid perfluoroalkyl ester and by otherwise following the process of the Example 30.

Example 32

The sample tape was produced by using the same method as in Example 18 except that the solution was mixed with a carboxylic perfluoroalkyl ester (compound 2 in Table 1) and a perfluoro polyether (produced by Montedison Company Inc. under the trade name of Fomblin) at a rate of 1:3.

With each of the produced sample tapes, dynamic frictional coefficients, shuttle durability and still durability at 25° C. and relative humidity (RH) of 50% and −5° C. were tested. The results are shown in Table 4.

TABLE 4

| | conditions | dynamic frictional coefficient | shuttle durability (number of times) | still durability (in minutes) |
|---|---|---|---|---|
| Ex. 18 | 25° C. | 0.25 | >150 | >120 |
| | −5° C. | 0.27 | >150 | >60 |
| Ex. 19 | 25° C. | 0.28 | >150 | >120 |
| | −5° C. | 0.29 | >150 | >60 |
| Ex. 20 | 25° C. | 0.28 | >150 | >120 |
| | −5° C. | 0.30 | >150 | >60 |

TABLE 4-continued

| | conditions | dynamic frictional coefficient | shuttle durability (number of times) | still durability (in minutes) |
|---|---|---|---|---|
| Ex. 21 | 25° C. | 0.27 | >150 | >120 |
| | −5° C. | 0.29 | >150 | >60 |
| Ex. 22 | 25° C. | 0.26 | >150 | >120 |
| | −5° C. | 0.28 | >150 | >60 |
| Ex. 23 | 25° C. | 0.25 | >150 | >120 |
| | −5° C. | 0.27 | >150 | >60 |
| Ex. 24 | 25° C. | 0.27 | >150 | >120 |
| | −5° C. | 0.29 | >150 | >60 |
| Ex. 25 | 25° C. | 0.30 | >150 | >120 |
| | −5° C. | 0.31 | >150 | >60 |
| Ex. 26 | 25° C. | 0.27 | >150 | >120 |
| | −5° C. | 0.29 | >150 | >60 |
| Ex. 27 | 25° C. | 0.25 | >150 | >120 |
| | −5° C. | 0.28 | >150 | >60 |
| Ex. 28 | 25° C. | 0.27 | >150 | >120 |
| | −5° C. | 0.28 | >150 | >60 |
| Ex. 29 | 25° C. | 0.24 | >150 | >120 |
| | −5° C. | 0.26 | >150 | >60 |
| Ex. 30 | 25° C. | 0.23 | >150 | >120 |
| | −5° C. | 0.25 | >150 | >60 |
| Ex. 31 | 25° C. | 0.24 | >150 | >120 |
| | −5° C. | 0.26 | >150 | >60 |
| Ex. 32 | 25° C. | 0.30 | >150 | >120 |
| | −5° C. | 0.31 | >150 | >60 |

It is seen from these Table that the tapes according to the Examples of the present invention exhibit highly stable running properties and small dynamic frictional coefficients under both the ambient and low temperature conditions while being completely free from damage on the tape surface even after 100 times of reciprocating running. It also exhibited excellent durability such that the output decrease of −3 dB was not observed after 150 times of shuttle running.

Examples 33 to 47

On a polyethylene terephthalate film 14 microns in thickness, cobalt Co was deposited by an oblique evaporation method for formation of a thin magentic metal film 1000 Å in thickness.

The surface of the thin magnetic metal film was coated with a solution obtained by dissolving 0.48 g of a carboxylic acid perfluoroalkyl ester in 800 g of Freon and admixing the resulting solution with a extreme pressure agent at a ratio of 1:1. The resulting coated film was cut to widths each of 8 mm to produce sample tapes.

Sample tapes were produced by using the compounds of Table 5(1) and 5(2) as the carboxylic acid perfluoroalkyl esters and the extreme pressure agent.

With each of the produced sample tapes, dynamic frictional coefficients shuttle durability and still durability at 25° C. and relative humidity (RH) of 50% and −5° C. were tested. The results are shown in Table 6.

TABLE 5

| Ex. NO. | carboxylic acid perfluoroalkyl ester | extreme pressure agents |
|---|---|---|
| 33 | oleic acid pentadeca-fluorooctyl ester | trilauryl trithiophosphite |
| 34 | linoleic acid pentadeca-fluorooctyl ester | dilauryl phosphate butyl amine salt |
| 35 | linolenic acid pentadeca-fluorooctyl ester | diisopropyl dithiophosphate |
| 36 | myristic acid pentadeca-fluorooctyl ester | di-2-ethylhexyl phoshate octyl amine salt |
| 37 | palmitic acid pentadeca-fluorooctyl ester | dioleyl phosphate octyl amine salt |
| 38 | myristic acid nonadeca-fluorodecyl ester | benzyl disulfide |
| 39 | linolenic acid nonadeca-fluorodecyl ester | octyl disulfide |
| 40 | butanoic acid nonadeca-fluorodecyl ester | di-2-ethylhexyl zinc thiophosphate |
| 41 | oleic acid pentadeca-fluorooctyl ester | dibutyl zinc dithiocarbamate |
| 42 | linoleic acid pentadeca-fluorooctyl ester | dibutyl zinc dithiophoshate |
| 43 | linolenic acid pentadeca-fluorooctyl ester | dimethyl zinc dithiocarbamate |
| 44 | myristic acid pentadeca-fluorooctyl ester | allyl bromide |
| 45 | myristic acid nonadeca-fluorodecyl ester | benzyl bromide |
| 46 | linoleic acid nonadeca-fluorodecyl ester | hexachloroethane |
| 47 | linolenic acid nonadeca-fluorodecyl ester | trilauryl trithiophosphate |

TABLE 6

| | conditions | dynamic frictional coefficient | shuttle durability (number of times) | still durability (in minutes) |
|---|---|---|---|---|
| Ex. 33 | 25° C. | 0.34 | >150 | >120 |
| | −5° C. | 0.37 | >150 | >60 |
| Ex. 34 | 25° C. | 0.33 | >150 | >120 |
| | −5° C. | 0.35 | >150 | >60 |
| Ex. 35 | 25° C. | 0.29 | >150 | >120 |
| | −5° C. | 0.31 | >150 | >60 |
| Ex. 36 | 25° C. | 0.32 | >150 | >120 |
| | −5° C. | 0.33 | >150 | >60 |
| Ex. 37 | 25° C. | 0.28 | >150 | >120 |
| | −5° C. | 0.35 | >150 | >60 |
| Ex. 38 | 25° C. | 0.29 | >150 | >120 |
| | −5° C. | 0.31 | >150 | >60 |
| Ex. 39 | 25° C. | 0.32 | >150 | >120 |
| | −5° C. | 0.35 | >150 | >60 |
| Ex. 40 | 25° C. | 0.29 | >150 | >120 |
| | −5° C. | 0.31 | >150 | >60 |
| Ex. 41 | 25° C. | 0.26 | >150 | >120 |
| | −5° C. | 0.29 | >150 | >60 |
| Ex. 42 | 25° C. | 0.31 | >150 | >120 |
| | −5° C. | 0.35 | >150 | >60 |
| Ex. 43 | 25° C. | 0.28 | >150 | >120 |
| | −5° C. | 0.32 | >150 | >60 |
| Ex. 44 | 25° C. | 0.27 | >150 | >120 |
| | −5° C. | 0.31 | >150 | >60 |
| Ex. 45 | 25° C. | 0.30 | >150 | >120 |
| | −5° C. | 0.33 | >150 | >60 |
| Ex. 46 | 25° C. | 0.30 | >150 | >120 |
| | −5° C. | 0.31 | >150 | >60 |
| Ex. 47 | 25° C. | 0.29 | >150 | >120 |
| | −5° C. | 0.30 | >150 | >60 |

It is seen from these Table that the tapes according to the Examples of the present invention exhibit highly stable running properties and small dynamic frictional coefficients under both the ambient and low temperature conditions while being completely free from damage on the tape surface even after 100 times of reciprocating running. They also exhibited excellent durability such that the output decrease of −3 dB was not observed after 150 times of shuttle running.

Examples 48 to 62

On a polyethylene terephthalate film 14 microns in thickness, cobalt Co was deposited by an oblique evaporation method for formation of a thin magnetic metal film 1000 Å in thickness.

The surface of the thin magnetic metal film was coated with a solution obtained by dissolving of a rust preventive in solvent (acetone:ethylether=1:1) so that the amount of the rust preventive will be equal to 10 mg/m².

And the surface of the rust preventive layer was coated with a solution obtained by dissolving of a carboxylic acid perfluoroalkyl ester in solvent (acetone:ethylether=1:1) so that the amount of the ester will be equal to 10 mg/m². The resulting coated film was cut to widths each of 8 mm to produce sample tapes. Sample tapes were produced by using the compounds of Table 7 as the carboxylic acid perfluoroalkyl esters and the rust preventive.

TABLE 7

|  | carboxylic acid perfluoroalkyl ester | rust preventives |
|---|---|---|
| Ex. 48 | oleic acid pentadecafluorooctyl ester | benzothiazole |
| Ex. 49 | linoleic acid pentadecafluorooctyl ester | diazosulfide |
| Ex. 50 | linolenic acid pentadecafluorooctyl ester | 2-methylbenzothiazole |
| Ex. 51 | myristic acid pentadecafluorooctyl ester | ethane thioacid |
| Ex. 52 | palmitic acid pentadecafluorooctyl ester | thiophenol |
| Ex. 53 | myristic acid nonadecafluorodecyl ester | thiouracyl |
| Ex. 54 | linolenic acid nonadecafluorodecyl ester | 3-methyl sulforane |
| Ex. 55 | butanoic acid nonadecafluorodecyl ester | thiazoline-4-carboxylic acid |
| Ex. 56 | oleic acid pentadecafluorooctyl ester | ascorbic acid |
| Ex. 57 | linoleic acid pentadecafluorooctyl ester | oxazole |
| Ex. 58 | linolenic acid pentadecafluorooctyl ester | guanine |
| Ex. 59 | myristic acid pentadecafluorooctyl ester | 5-amino-1H—tetrazole |
| Ex. 60 | palmitic acid pentadecafluorooctyl ester | 4-amino benzophenone |
| Ex. 61 | myristic acid nonadecafluorodecyl ester | 2-amino naphthoquinone |
| Ex. 62 | linolenic acid nonadecafluorodecyl ester | 1,2-naphthalene diol |

The initial coercive force ($Hc_1$) and saturation magnetization ($Is_1$) of the prepared sample tapes as well as the coercive force ($Hc_2$) and saturation magnetization ($Is_2$) after the tapes were allowed to stand for one week at 45 C. and relative humidity of 80 percent, were measured, and the transition ratio thereof were obtained by the following formula. As comparative example, the similar transition ratio were found of the blank tape completely free of the protective layer. The results are shown in Table 8.

Transition ratio of $Hc = (Hc_2 - Hc_1)/Hc_1 \times 100(\%)$
Transition ratio of $Is = (Is_2 - Is_1)/Is_1 \times 100(\%)$

TABLE 8

|  | transition ratio of Hc | transition ratio of Is |
|---|---|---|
| Ex. 48 | +1.0 | −2.2 |
| Ex. 49 | +1.2 | −2.2 |
| Ex. 50 | +1.0 | −1.6 |
| Ex. 51 | +0.6 | −1.4 |
| Ex. 52 | +1.2 | −1.8 |
| Ex. 53 | +1.0 | −1.2 |
| Ex. 54 | +0.8 | −1.6 |
| Ex. 55 | +1.0 | −2.1 |
| Ex. 56 | +0.8 | −1.9 |
| Ex. 57 | +1.0 | −1.3 |
| Ex. 58 | +1.5 | −1.4 |

TABLE 8-continued

|  | transition ratio of Hc | transition ratio of Is |
|---|---|---|
| Ex. 59 | +1.2 | −1.8 |
| Ex. 60 | +0.8 | −1.7 |
| Ex. 61 | +0.5 | −2.0 |
| Ex. 62 | +0.9 | −1.9 |
| Comp. Ex. | +3.4 | −5.8 |

With each of the produced sample tapes, dynamic frictional coefficients, shuttle durability and still durability at 25° C. and relative humidity (RH) of 50% and −5° C. were tested. The results are shown in Table 9.

TABLE 9

|  | conditions | dynamic frictional coefficient | shuttle durability (number of times) | still durability (in minutes) |
|---|---|---|---|---|
| Ex. 48 | 25° C. | 0.24 | >150 | >120 |
|  | −5° C. | 0.27 | >150 | >60 |
| Ex. 49 | 25° C. | 0.30 | >150 | >120 |
|  | −5° C. | 0.34 | >150 | >60 |
| Ex. 50 | 25° C. | 0.29 | >150 | >120 |
|  | −5° C. | 0.37 | >150 | >60 |
| Ex. 51 | 25° C. | 0.30 | >150 | >120 |
|  | −5° C. | 0.35 | >150 | >60 |
| Ex. 52 | 25° C. | 0.40 | >150 | >120 |
|  | −5° C. | 0.43 | >150 | >60 |
| Ex. 53 | 25° C. | 0.28 | >150 | >120 |
|  | −5° C. | 0.27 | >150 | >60 |
| Ex. 54 | 25° C. | 0.27 | >150 | >120 |
|  | −5° C. | 0.34 | >150 | >60 |
| Ex. 55 | 25° C. | 0.27 | >150 | >120 |
|  | −5° C. | 0.31 | >150 | >60 |
| Ex. 56 | 25° C. | 0.24 | >150 | >120 |
|  | −5° C. | 0.28 | >150 | >60 |
| Ex. 57 | 25° C. | 0.30 | >150 | >120 |
|  | −5° C. | 0.35 | >150 | >60 |
| Ex. 58 | 25° C. | 0.30 | >150 | >120 |
|  | −5° C. | 0.37 | >150 | >60 |
| Ex. 59 | 25° C. | 0.29 | >150 | >120 |
|  | −5° C. | 0.35 | >150 | >60 |
| Ex. 60 | 25° C. | 0.41 | >150 | >120 |
|  | −5° C. | 0.44 | >150 | >60 |
| Ex. 61 | 25° C. | 0.29 | >150 | >120 |
|  | −5° C. | 0.29 | >150 | >60 |
| Ex. 62 | 25° C. | 0.28 | >150 | >120 |
|  | −5° C. | 0.30 | >150 | >60 |
| Comp. Ex. | 25° C. | 0.90 | >3 | >2 |
|  | −5° C. | — | — | — |

It is seen from these Table that the tapes according to the Examples of the present invention exhibit highly stable running properties and small dynamic frictional coefficients under both the ambient and low temperature conditions while being completely free from damage on the tape surface even after 100 times of reciprocating running. They also exhibited excellent durability such that the output decrease of −3 dB was not observed after 150 times of shuttle running. Conversely, the tape devoid of the lubricating layer according to the Comparative Example suffered from unstable running, tape wear low durability and increasing frictional coefficient with increase in the number of times of reciprocating running.

What is claimed is:

1. A magnetic recording medium comprising a nonmagnetic base, a thin film metal magnetic layer formed on said non-magnetic base, a first layer containing a rust preventive formed on said magnetic layer and a second layer containing a lubricant formed on said first layer, said second layer containing a carboxylic acid perfluoroalkyl ester represented by the following general formula:

$$RCOO(CH_2)_j C_k F_{2k+1}$$

where R is a hydrocarbon residue, j is an integer and may be 0, and k is an integer not less than 4, said second layer also containing an extreme pressure agent selected from the group consisting of phosphorus containing, sulfur containing, halogen containing, and organo metallic extreme pressure agents, and composite type extreme pressure agents.

2. A magnetic recording medium according to claim 1, wherein said rust preventative is selected from the group consisting of phenols, naphthols, quinones, diarylketones, heterocyclic compounds containing nitrogen, heterocyclic compounds containing oxygen, heterocyclic compounds containing sulfur, compounds containing mercapto groups, thiocarboxylic acids or salts thereof, and thiazole compounds.

3. A magnetic recording medium according to claim 1, wherein the compositional weight ratio of said carboxylic acid perfluoroalkyl ester and said extreme pressure agent is between 70:30 and 30:70.

4. A magentic recording medium according to claim 1, wherein the amount of the lubricant in said second layer is in the range from 0.5 to 100 mg/m$^2$.

5. A magnetic recording medium according to claim 1, wherein the amount of the lubricant in said second layer is in the range from 1 to 20 mg/m$^2$.

6. A magnetic recording medium according to claim 1, wherein the amount of the rust preventive in said first layer is in the range from 0.5 to 100 mg/m$^2$.

7. A magnetic recording medium according to claim 1, wherein the amount of rust preventive in said second layer is in the range of 1 to 20 mg/m$^2$.

* * * * *